United States Patent [19]

Chen, Sr. et al.

[11] Patent Number: 5,070,144

[45] Date of Patent: Dec. 3, 1991

[54] REACTIVE COMPATIBILIZATION OF POLYACETAL AND POLYPROPYLENE BLENDS

[75] Inventors: Paul N. Chen, Sr., Gillette; Alex Forschirm, Parsippany; Morton Glick, Summit; Michael Jaffe, Maplewood, all of N.J.

[73] Assignee: Hoechst Celanese Corp., Somerville, N.J.

[21] Appl. No.: 622,430

[22] Filed: Dec. 5, 1990

[51] Int. Cl.$^5$ .................... C08G 63/48; C08G 63/91; C08L 51/00; C08L 61/00
[52] U.S. Cl. ...................................... 525/154; 525/64
[58] Field of Search .................................. 525/64, 154

[56] References Cited

U.S. PATENT DOCUMENTS

| | | | |
|---|---|---|---|
| 4,299,927 | 11/1981 | Dombroski | 525/64 |
| 4,556,690 | 12/1985 | Nakagawa | 525/64 |
| 4,584,347 | 4/1986 | Harpell et al. | 525/64 |
| 4,670,508 | 6/1987 | Ohdaira et al. | 525/64 |
| 4,788,258 | 11/1988 | Collins et al. | 525/414 |
| 4,942,208 | 7/1990 | Forschirm et al. | 525/414 |

*Primary Examiner*—Melvyn I. Marquis
*Assistant Examiner*—W. R. H. Clark
*Attorney, Agent, or Firm*—Joseph M. Mazzarese

[57] ABSTRACT

A compatible polymer blend containing a polyacetal, a hydroxylated polyacetal, polypropylene, and an acid-grafted polyolefine such as a muconic acid-polypropylene graft copolymer. The polyacetal is preferably a polyoxymethylene polymer such as Celcon®. The preferred hydroxylated polyacetal is one having a structure very similar to the polyacetal. The invention also includes a process for forming a compatible blend containing polypropylene and polyacetal by melt mixing polypropylene and polyacetal with an acid grafted polyolefin and hydroxylated polyacetal.

5 Claims, 2 Drawing Sheets

FIG. 2
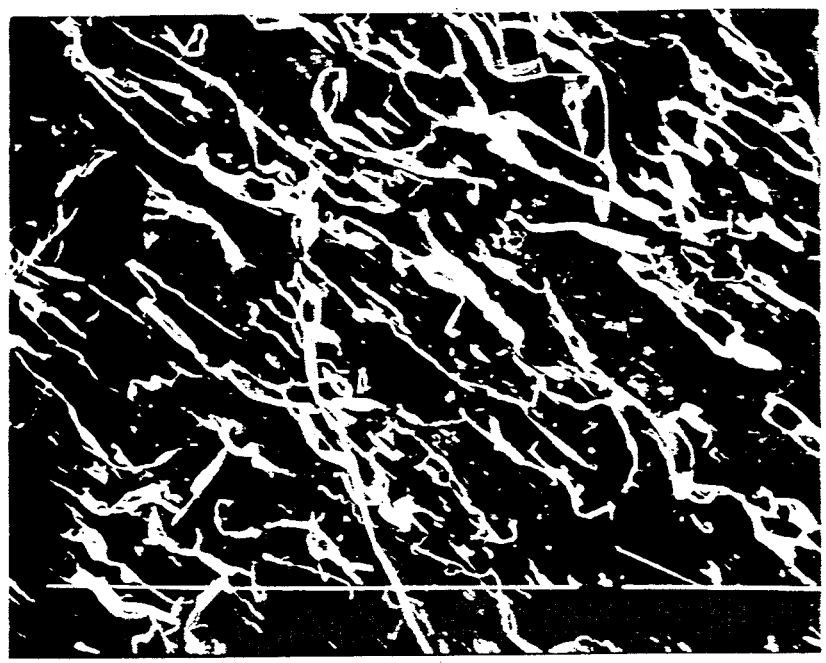
SEM OF BLEND A (75x)
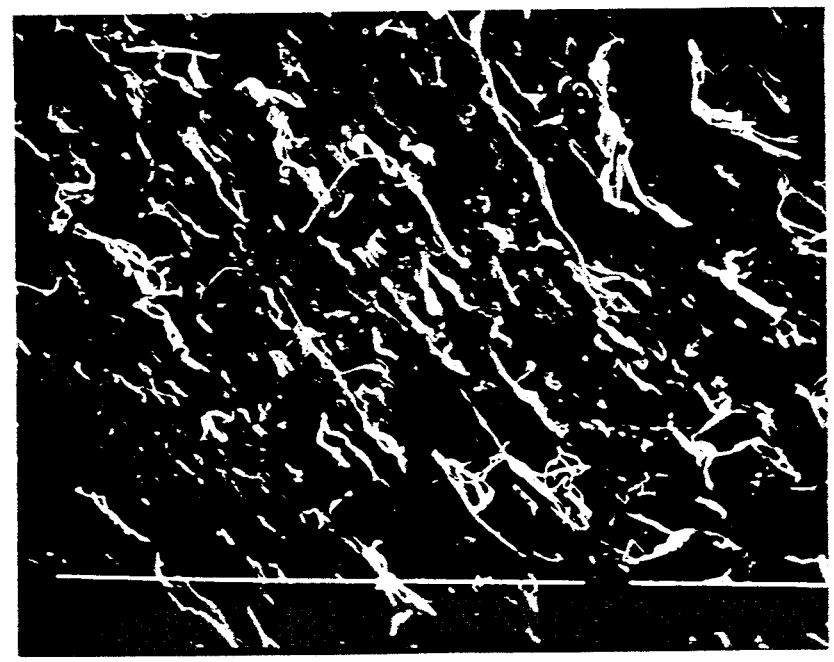
SEM OF BLEND D (75x)

REACTIVE COMPATIBILIZATION OF POLYACETAL AND POLYPROPYLENE BLENDS

BACKGROUND OF THE INVENTION

The present invention relates to the field of polymer blends, particularly to blends of a polyacetal and a polypropylene wherein compatibilizing agents are used.

Polyacetals are polymers having repeating units of the formula ($-O-(CR_1R_2)_n-$) where $R_1$ and $R_2$ are independently either hydrogen or a lower alkyl group and n is an integer. The simplest polyacetal is polyoxymethylene, which has repeat units of the formula ($-O-CH_2-$). However, polyoxymethylene tends to decompose readily to form formaldehyde. One solution to this decomposition problem is to incorporate into this polymer a small percentage of units of higher polyoxyalkylenes, e.g., polyoxyethylene. Hoechst Celanese Corporation sells a polymer called CELCON ® comprising about 98% oxymethylene units and about 2% oxyethylene units. CELCON ® is usually made by copolymerizing trioxane (98%) and ethylene oxide (2%).

Another solution to the decomposition of polyoxymethylene is to put other units, e.g. acetate groups, on each end of the polymer. E. I. duPont de Nemours Co., Inc. sells such a polymer under the name Delrin ®.

Polypropylene comprises repeating units of ($-CH(CH_3)CH_2-$). Polypropylene is relatively inert to chemical attack, but tends to be soft and is not stable at high temperature. Polyacetals, however, are more rigid and more stable at high temperatures but more vulnerable to chemical attack. A blend or a laminate combining these two types of polymers and having the best features of both would be very desirable. Unfortunately, these polymer do not adhere or blend well and tend to separate.

Polypropylene may be modified by grafting. For example, functional monomers such as acrylic acid or muconic acid (2,4-hexadienedioic acid) may be added to the polymer to form a modified polyolefin having a small percentage of functional groups attached to the main chain. Such modification may affect the compatibility or solubility of the polymer with certain other polymers or solvents.

Acrylic acid grafted polypropylene is available from BP chemicals. Cis,cis- and cis,trans-muconic acid are presently available from Celgene Corporation. Muconic acid grafted polypropylene is within the subject matter of a patent application filed on the same day as this application by the same inventors entitled, "MUCONIC ACID GRAFTED POLYOLEFIN COMPATIBILIZERS", the description of which is herein incorporated by reference.

Modified polyacetals may also be made. For example, a hydroxylated polyacetal may be produced by copolymerization and hydrolysis. A hydroxylated form of Celcon ® may be produced by reacting trioxane with an ester co-monomer, such as a glycerol formal benzoate, and hydrolyzing the ester group. The resulting polymer contains units having pendant hydroxyl groups, e.g. ($-CH_2-CH(OH)-$) or ($-CH(CH_2OH)-$), interspersed between ($-O-CH_2-$) units. Further information regarding hydroxylated polyacetals may be found in co-pending U.S. patent applications Ser. Nos. 350,781, 350,782 and 350,791, the disclosures of which are herein incorporated by reference.

U.S. Pat. Nos. 4,455,273 and 4,584,347 describe modified polyolefin fibers wherein polyolefin graft copolymers and polyoxymethylenes may be used as additives.

U.S. Pat. No. 4,670,508 describes a thermoplastic resin composition comprising a thermoplastic resin, e.g. a polyacetal, and an ultrahigh molecular weight polyolefin.

U.S. Pat. No. 4,766,168 teaches a stabilized polyacetal composition wherein certain hydroxy containing polymers and/or oligomers may be added to a polyacetal molding composition.

U.S. Pat. No. 4,873,282 discloses a polyacetal resin composition containing a polyolefin and carbon black.

U.S. Pat. No. 4,556,690 describes an acetal resin composition that includes an modified alpha-olefin that is a graft polymerization product of an alpha-olefin and an unsaturated carboxylic acid or derivative thereof.

U.S. Pat. Nos. 4,214,034, 4,220,736, 4,250,661, and 4,266,370 are directed to agricultural covering films and sheets for thermal insulation comprising an acetal resin and a thermoplastic olefinic resin.

U.S. Pat. No. 4,816,530 disclose a polymer blend of a carbon monoxide-olefin copolymer and a polyacetal.

European Patent Application No. 89105785.3 filed Apr. 3, 1989 and having a publication no. 0 338 303 describes a thermoplastic resin composition comprising a polyoxymethylene resin and a multi-phase thermoplastic resin that includes an epoxy group-containing olefin copolymer.

SUMMARY OF THE INVENTION

The present invention comprises a polymer blend comprising a polyacetal, a hydroxylated polyacetal, polypropylene and an acid-grafted polyolefin. The polyacetal is preferably a polyoxymethylene polymer such as Celcon ®. The preferred hydroxylated polyacetal is one having a structure very similar to the polyacetal. Preferably, the acid-grafted polyolefin is a muconic acid-polypropylene graft copolymer.

The invention further comprises a method for forming a compatible blend comprising polypropylene and polyacetal. The method comprises the reactive compatibilization of polypropylene and polyacetal with muconic acid grafted polypropylene and hydroxylated polyacetal by melt mixing or melt compounding the blend components.

It is an object of the present invention to provide a compatible blend comprising polypropylene and polyacetal.

It is another object of the present invention to provide a novel polymer composition.

It is a further object of the present invention to provide a novel method for forming a compatible blend comprising polypropylene and polyacetal.

These and other objects of this invention will be apparent to those skilled in the art from the following description and the appended claims.

BRIEF DESCRIPTION OF THE DRAWINGS

FIG. 2 compares scanning electron micrographs of a blend according to the present invention and a 50/50 polypropylene/Celcon ® blend.

DETAILED DESCRIPTION OF THE PREFERRED EMBODIMENTS

Figure 1:
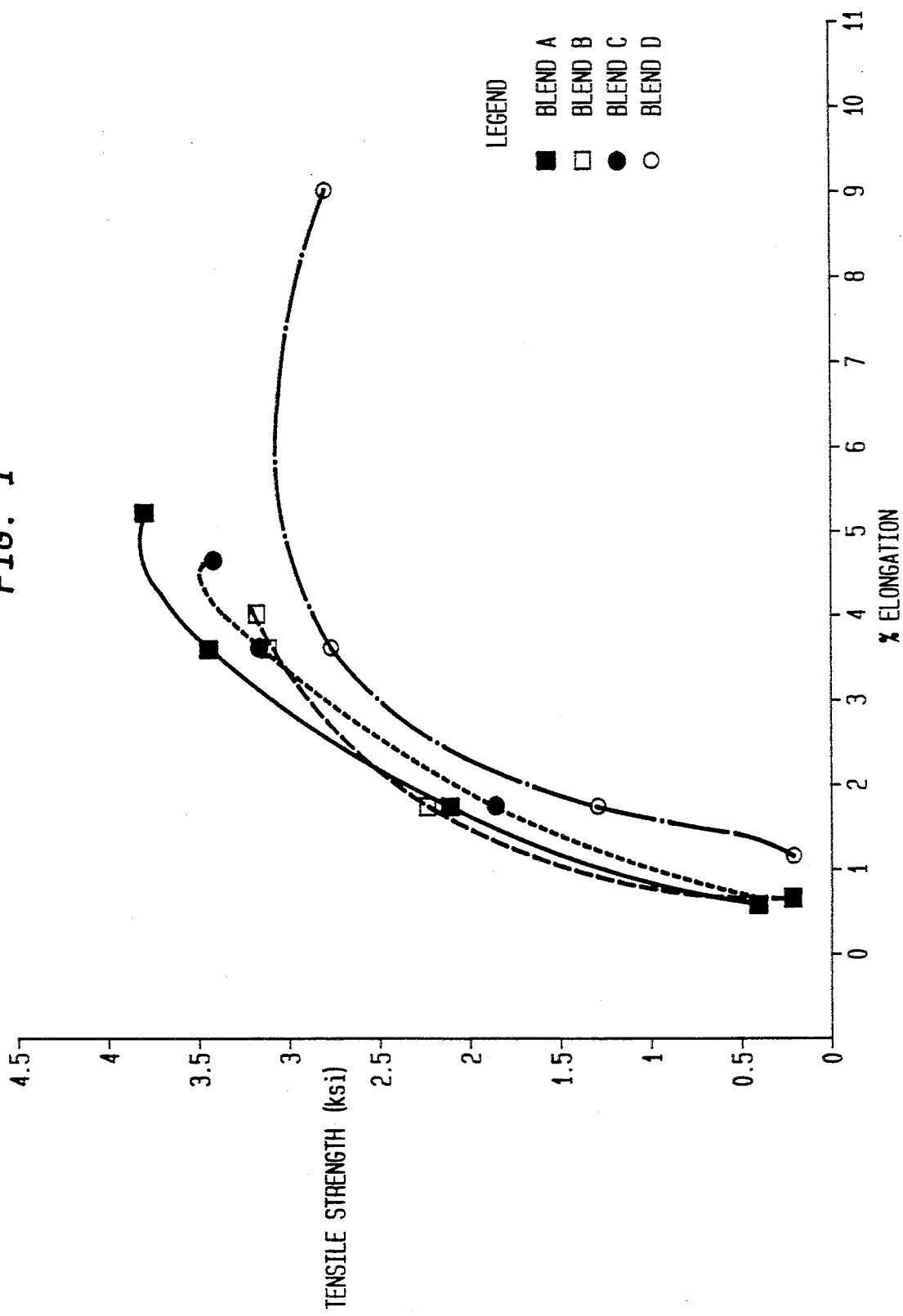
FIG. 1 plots the tensile strength vs. the % elongation for four polymer blends, including a blend according to the present invention.

In one aspect of the present invention, a compatible polymer blend comprising polypropylene and Celcon ® polyacetal is formed by melt mixing or melt compounding these polymers with a hydroxylated polyacetal and a muconic acid-polypropylene graft copolymer.

The preferred hydroxylated polyacetal is one having a structure very similar to the Celcon ®, such as those described in co-pending U.S. patent applications Ser. Nos. 350,781, 350,782 and 350,791. The preferred muconic acid-polypropylene graft copolymer has an intrinsic viscosity in the approximate range of 1.0-3.0 and a muconic acid content in the approximate range of 0.1%-5.0% by weight.

The compositions of this invention are essentially a four-component polymer blend. The polypropylene and polyacetal components together comprise at least about half the weight of the blend, and preferably each independently comprises from about 30% to about 70% of the blend, most preferably about 40-50% by weight. The acid-grafted polyolefin copolymer comprises approximately 1-25%, preferably about 5-20%, and most preferably about 10-15% of the blend by weight. The hydroxylated polyacetal comprises up to about 20% by weight, preferably approximately 1-10% by weight, of the blend. Preferably, the polypropylene and polyacetal components are present in approximately equal amounts.

The four component polymers are melt mixed at a temperature and for a time sufficient to achieve reactive compatibilization; when this has been achieved, the blend will appear to be uniform throughout and will not separate. Melt mixing is performed at temperatures in the range of about 160° C. to about 240° C., preferably from about 180° C. to about 220° C. The time required will vary depending on the mixing temperature, on the mixing efficiency of the mixing apparatus or procedure, on the proportions of the components in the blend, on the exact structure and molecular weight of the blend components, and to some extent on the quantity of materials mixed. When a commercial melt mixer such as a Haake Buchler Instruments, Inc. System 90 Melt Mixer is used, typical mixing times are in the approximate range of 0.5-60 minutes at temperatures near 200° C. and mixing speeds of about 50 rpm to about 200 rpm.

The blends of this invention have a unique set of properties. These blends have much greater rigidity and high temperature stability than polypropylene as well as a high degree of inertness to chemical attack. Because these blends exhibit toughness, resistance to chlorine and other chemicals, heat resistance, rigidity, and strength, they are useful in a variety of applications where neither polypropylene nor polyacetal individually are satisfactory. For example, these blends may be used to make molded products such as pipes for waste or other systems, coatings for polyacetal or polypropylene based products, specialty films, and the like, using known techniques. To make a film or sheet out of the compatible polymer blend of the present invention, for instance, the blend may be calendered with heated rolls to form a film or sheet having the desired thickness.

The following non-limiting Example illustrates one embodiment of the present invention and compares the inventive four-part blend to other related compositions.

EXAMPLE I

Four separate blends, A, B, C and D, containing polypropylene and Celcon ® (grade M-25) were melt mixed in a Haake Buchler Instru., Inc. System 90 Melt Mixer at 200° C. and 100 rpm for about 30 minutes; these blends were then made into films by calendering at 200° C. and 1000 psi. Blend A is a 50/50 polypropylene/Celcon ® blend. Blend B includes 10% hydroxylated Celcon ®. Blend C includes 10% muconic acid-polypropylene copolymer. Blend D is a four-component polymer blend within the scope of the present invention. The table below lists ingredients and properties for each of blends A-D.

|   | % PP | % MP | % C—OH | % C | $T_m$ | $\Delta H$ | TS | M | % E |
|---|------|------|--------|-----|-------|------------|------|------|-----|
| A | 50 | 0 | 0 | 50 | 163 | 106 | 3.75 | 0.21 | 5.7 |
| B | 50 | 0 | 10 | 40 | 163 | 108 | 3.15 | 0.20 | 4.4 |
| C | 40 | 10 | 0 | 50 | 163 | 106 | 3.38 | 0.19 | 5.1 |
| D | 40 | 15 | 5 | 40 | 161 | 92 | 2.77 | 0.19 | 9.9 |

% PP = % polypropylene
% MP = % muconic acid-polypropylene copolymer
% C = % Celcon ®
% C—OH = % hydroxylated polyacetal
$T_m$ = melting point temperature of blend in °C.
$\Delta H$ = heat of fusion of the blend in J/g
TS = tensile strength of film in ksi
M = modulus of film in msi
% E = % of elongation of film without tearing The data in the preceding table show that blend D has a 13-15% lower $\Delta H$ and an approximately two-fold increase in percent elongation compared to blends A-C. These results are quite surprising in that since blends B and C each have a $\Delta H$ that is the same or higher than that of blend A and a percent elongation less than that of blend A, one would not expect a blend of all four components to exhibit a significantly lower $\Delta H$ and a significantly higher percent elongation.

FIG. 1 plots the tensile strength vs. the % elongation for blends A-D. FIG. 2 compares a scanning electron micrograph (SEM) of blend A to a SEM of blend D; the former shows a great deal of phase separation, as is expected in an incompatible polymer mixture, while the latter shows much less phase separation, indicating greater compatibility.

Due to their similar chemical structures, one may expect the polypropylene and the muconic acid-polypropylene copolymer to blend together well, and the Celcon ® and hydroxylated Celcon ® to blend together well. FT-IR analysis indicates that the quaternary blend of this invention may include ester linkages between the muconic acid-polypropylene copolymer and the hydroxylated Celcon ®. These molecular scale interactions may explain the high degree of compatibility that these blends exhibit. However, the molecular interactions of these polymers are not well understood and this paragraph is not to be construed as limiting the present invention to blends having the molecular interactions described herein.

Those skilled in the art will understand that many variations of the present invention are possible. The present invention is not limited to the embodiments illustrated and described but encompasses all the subject matter within the scope of the appended claims.

We claim:

1. A polymer blend comprising:
   a polyacetal;
   polypropylene;
   a hydroxylated polyacetal; and,
   muconic acid-grafted polypropylene,
wherein said polyacetal and polypropylene together comprise at least about 50% by weight of said blend.

2. A polymer blend according to claim 1 wherein said polypropylene and said polyacetal each independently comprise from about 30% to about 70% by weight of said blend.

3. A polymer blend according to claim 1 wherein said polypropylene and said polyacetal each independently comprise from about 40% to about 50% by weight, said hydroxylated polyacetal comprises up to about 20% by weight, and said muconic acid-grafted polypropylene comprises approximately 1-25% by weight, of said blend.

4. A polymer blend according to claim 3 wherein said hydroxylated polyacetal comprises from about 5% to about 10% by weight, and said muconic acid-grafted polypropylene comprises approximately 5-20% by weight, of said blend.

5. A compatible polymer blend comprising:
   approximately 30% to approximately 70% by weight of a polyacetal;
   approximately 30% to approximately 70% by weight polypropylene;
   approximately 1% to approximately 20% by weight hydroxylated polyacetal; and,
   approximately 1% to approximately 25% of a muconic acid-polypropylene graft copolymer.

* * * * *